Dec. 24, 1968  R. A. COOK  3,417,846
CLUTCH AND DISC SPRING WITH STIFF LEVERS
Filed Nov. 14, 1966  2 Sheets-Sheet 1
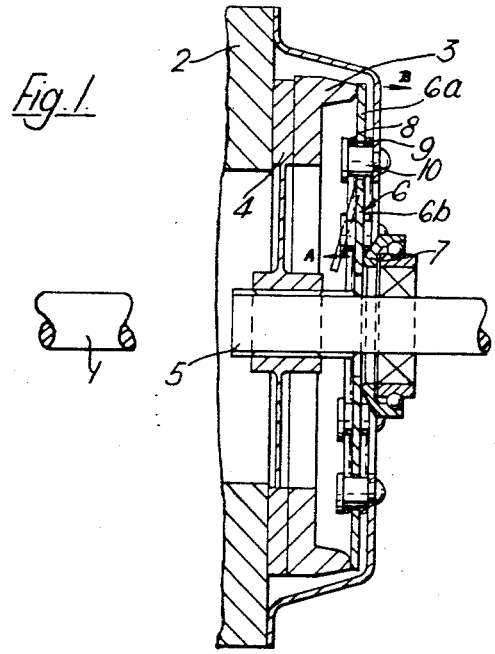
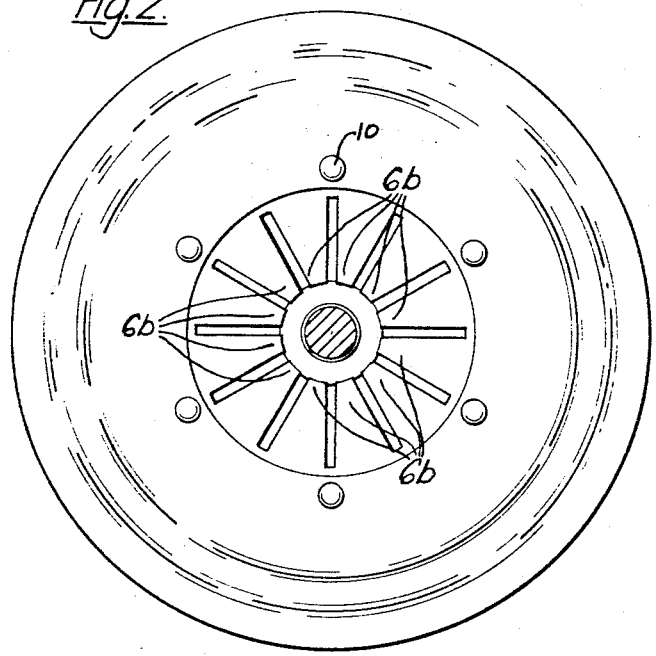
Inventor
RONALD ALAN COOK
By John R. Faulkner
Clifford L. Sadler
Attorney

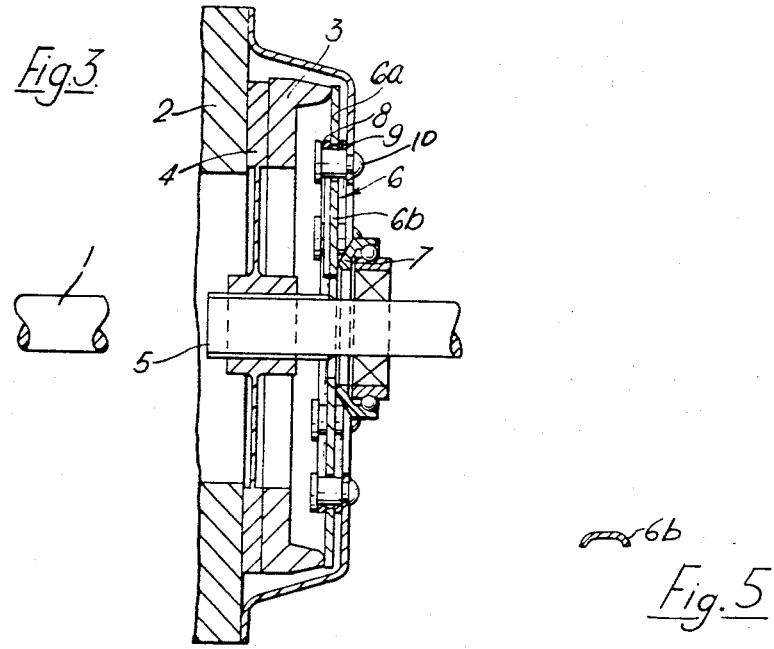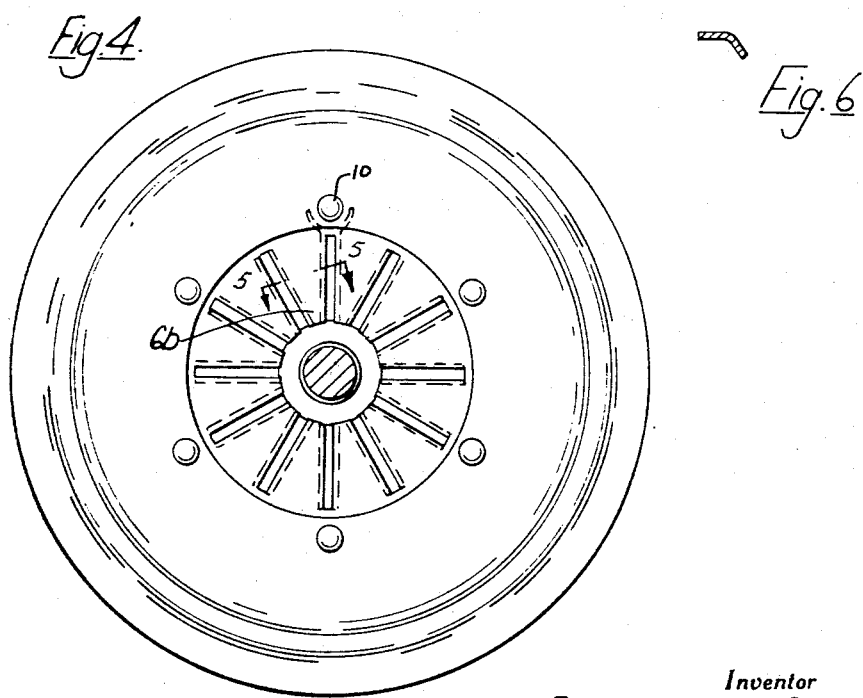

United States Patent Office 3,417,846
Patented Dec. 24, 1968

3,417,846
CLUTCH AND DISC SPRING WITH STIFF LEVERS
Ronald Alan Cook, Hockley, England, assignor to Ford Motor Company, Dearborn, Mich., a corporation of Delaware
Filed Nov. 14, 1966, Ser. No. 593,901
1 Claim. (Cl. 192—89)

ABSTRACT OF THE DISCLOSURE

A clutch mechanism for a motor vehicle having a clutch cover connected to a flywheel, a pressure plate positioned between the cover and the flywheel, and a clutch disc positioned between the pressure plate and the flywheel. A flat spring, having a substantially flat annular portion and a plurality of integral fingers extending radially inwardly from the annular portion, exerts a force tending to move said pressure plate away from said cover into engagement with said disc. The spring fingers are bent along a pair of diverging lines that extend the length of the fingers to form a generally channel-shape cross section and whereby said fingers are substantially stiffer than flat springs of the same thickness.

---

The present invention relates to clutch mechanisms for motor vehicles.

In a well-known construction of clutches, a diaphragm spring is employed to urge two clutch input members together to clamp a clutch disc between them in order to transmit torque from an input to an output shaft. The diaphragm spring comprises an outer annular portion the outer periphery which engages one of the input members and a plurality of fingers extend radially inwardly from the annular portion. An annular fulcrum member abuts the spring where the outer end of the fingers join the annular portion of the spring. The radially inner ends of the fingers are movable axially to cause the spring to flex about the annular fulcrum member to withdraw the outer periphery of the outer portion from the input member and thus release the pressure on the clutch disc.

In this known construction, the periphery of the annular portion must move a predetermined axial distance in order to release the clutch. This movement is produced by movement of the inner ends of the fingers a given amount in the opposite axial direction. However, owing to the relative flexibility of the fingers additional work must be done in flexing the fingers before corresponding movement of the periphery of the annular portion is effected. This extra work is reflected in the relatively high pedal pressure required to depress the clutch pedal, for a given pedal travel and given mechanical advantage of the linkage between the pedal and the clutch.

The present invention is concerned with reducing the clutch pedal pressure by modifying the known diaphragm spring.

According to one embodiment of the present invention, a clutch mechanism would have the following features:

(a) An input shaft is connected to drive two input members;

(b) An output shaft has an annular clutch disc keyed to it and the periphery of the disc is located between the two input members;

(c) A diaphragm spring is concentric with the output shaft and has an outer annular portion which engages one input member to urge that input member toward the other input member to clamp the clutch disc between them and thus enable torque to be transmitted from the input to the output shaft through the clutch disc;

(d) The diaphragm spring has a plurality of fingers extending radially inwardly from the annular portion and an annular fulcrum member bears on the diaphragm spring where the annular portion joins the radially outer ends of the fingers;

(e) The radially inner ends of the fingers are movable axially by an actuating device to cause the annular portion to move away from the input member and to release the clutch; and (f) The fingers are formed so that they are stiffer than corresponding fingers of the same thickness as the annular portion of the diaphragm spring.

How the invention may be carried out will now be described with reference to the accompanying drawings, in which:

FIGURE 1 is a sectional view of a known construction mechanism;

FIGURE 2 is an end view of FIGURE 1;

FIGURE 3 is a sectional view similar to FIGURE 1 of a clutch incorporating the present invention;

FIGURE 4 is an end view similar to FIGURE 2 of the clutch of FIGURE 3;

FIGURE 5 is a cross sectional view taken along section lines 5—5 of FIGURE 4 of one of the fingers of the diaphragm spring of the clutch shown in FIGURES 3 and 4; and FIGURE 6 is a cross sectional view of an alternative construction of clutch finger.

Referring to FIGURES 1 and 2, this known clutch mechanism comprises an input shaft 1 which comprises two input members 2 and 3 which are movable axially with respect to each other. A clutch disc 4 is splined to an output shaft 5 and has its outer periphery located between the input members 2 and 3. A diaphragm spring 6 which is coaxial with the output shaft 5 has its outer periphery abutting against the input member 3 to normally urge the input member 3 toward the input member 2 and thus clamp the clutch disc 4 between them so that torque can be transmitted from the input shaft 1 to the output shaft 5 through the clutch disc 4.

The diaphragm spring 6 comprises an outer annular portion 6a and a plurality of radially inwardly extending fingers 6b. A pair of spaced apart rings 8 and 9 carried by studs 10 mounted on the input member 2, form a fulcrum member for the diaphragm spring. The rings 8 and 9 engage the diaphragm spring at the area where the radially outer ends of the fingers 6b join the annular portion 6a of the spring. The radially inner ends of the fingers 6b are movable in the direction of the arrow A in FIGURE 1 by a clutch release bearing 7 which is coaxial with the output shaft 5 and movable coaxially with respect to it. In order to disengage the clutch, the bearing 7 is moved in the direction of the arrow A by a suitable actuating mechanism (not shown) to cause the inner ends of the fingers 6b to move in the same direction. This results in the outer periphery of the annular portions 6a moving in the opposite axial direction indicated by arrow B to thus relieve the pressure on the input member 3.

In this known construction, the fingers 6b are relatively flexible so that initial movement of the bearing 7 is taken up in bending the fingers 6b and not in moving the outer periphery of the annular portion 6a. This means that in order to produce a given axial movement of the outer periphery of the annular portion 6a, extra work must be done in flexing the finger 6b.

In the embodiment of the present invention shown in FIGURES 3 and 4, the clutch mechanism is basically the same as that already described with reference to FIGURES 1 and 2 and the same reference numerals have been used to indicate corresponding parts. However, in this embodiment the fingers 6b of the diaphragm spring are stiffened by being made of channel cross section. Two alternative sections are shown in FIGURES 5 and 6. Since the fingers 6b are rigid compared with the resilient fingers 6b of FIGURES 1 and 2, less work has to be done to flex the fingers. In other words, a smaller axial movement of the inner end of each finger 6b is required to disengage the clutch compared with the movement which would be necessary for the inner ends of the fingers 6b in the known clutch mechanism of FIGURES 1 and 2. This means that it is possible to reduce the pedal pressure for a given pedal travel.

The following example will illustrate how this is achieved. Consider the clutch of FIGURES 1 and 2. Let the pedal travel be 5 inches, the mechanical advantage of the linkage between the pedal and the bearing 7 be 10:1, the axial force that has to be applied by the bearing 7 in order to disengage the clutch be 200 pounds, and the axial distance the bearing 7 has to move be 0.5 inch. Then the work done by the bearing is equal to 100 inch pounds. Since this must equal the work done on the pedal, the pedal pressure must be 20 pounds.

Consider the clutch of FIGURES 3 and 4. Let the pedal travel be 5 inches and the bearing force be 200 pounds. However, since the relatively flexible fingers 6b are replaced by relatively stiff members, the bearing travel will be less, say 0.1 inch. Now the work done by the bearing is 20 inch pounds. Since we wish to maintain the pedal travel at 5 inches and the work done on the pedal must equal 20 inch pounds, the new pedal pressure is 4 pounds. Of course, in order to keep the pedal travel the same, the mechanical advantage of the linkage must be altered to 50:1.

The pedal pressure of the known clutch of FIGURES 1 and 2 could be reduced by increasing the mechanical advantage of the linkage but this by itself would result in the pedal travel being increased, in the example above to 25 inches. Therefore, the present invention enables the pedal pressure to be easily reduced while still maintaining the pedal travel within practical limits.

The foregoing description presents the presently preferred embodiments of this invention. Modifications and alterations may occur to those skilled in the art that will come within the scope and spirit of the following claim.

I claim:
1. A clutch mechanism comprising a flywheel, a clutch cover, a pressure plate, a clutch disc, and a flat disc spring,
   said clutch cover being connected to said flywheel,
   said pressure plate being positioned between said cover and said flywheel,
   said clutch disc being positioned between said pressure plate and said flywheel,
   said flat spring having a substantially flat annular portion and a plurality of integral fingers extending radially inwardly from said annular portion,
   said cover extending over and enclosing said annular portion and the juncture between said fingers and said annular portion,
   said spring having an outer periphery engaging said pressure plate,
   fulcrum mean securing said spring to said cover adjacent the juncture of said annular portion and said fingers,
   said spring exerting a force tending to move said pressure plate away from said cover into engagement with said disc,
   said fingers being thicker than said annular portion,
   some of said fingers being bent along a pair of diverging lines extending the length of said fingers to form a generally channel-shape cross section having reinforcing edge flanges whereby said fingers are substantially stiffer than flat springs of the same thickness.

References Cited
UNITED STATES PATENTS

| | | | |
|---|---|---|---|
| 2,047,737 | 7/1936 | Lane | 192—89 XR |
| 2,073,146 | 3/1937 | Gardiner | 192—89 XR |
| 3,130,828 | 4/1964 | Maurice | 192—89 XR |

BENJAMIN W. WYCHE III, *Primary Examiner.*

U.S. Cl. X.R.

192—70.3